United States Patent
Jeong et al.

(10) Patent No.: US 11,333,110 B2
(45) Date of Patent: May 17, 2022

(54) VARIABLE INTAKE SYSTEM FOR VEHICLE

(71) Applicants: Hyundai Motor Company, Seoul (KR); Kia Motors Corporation, Seoul (KR)

(72) Inventors: Hae Jun Jeong, Gyeonggi-do (KR); Je Yeon Kim, Gyeongsangnam-do (KR); Yoon Geun Cho, Daegu (KR); Seung Hyun Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 103 days.

(21) Appl. No.: 16/989,178

(22) Filed: Aug. 10, 2020

(65) Prior Publication Data

US 2021/0293207 A1    Sep. 23, 2021

(30) Foreign Application Priority Data

Mar. 19, 2020  (KR) .................... 10-2020-0033670

(51) Int. Cl.
| | |
|---|---|
| *F02M 35/02* | (2006.01) |
| *F02M 35/10* | (2006.01) |
| *F16K 17/02* | (2006.01) |
| *F02M 35/024* | (2006.01) |
| *F02B 27/02* | (2006.01) |

(52) U.S. Cl.
CPC .. *F02M 35/0209* (2013.01); *F02M 35/02416* (2013.01); *F02M 35/10144* (2013.01); *F02M 35/10255* (2013.01); *F16K 17/02* (2013.01); *F02B 27/02* (2013.01); *F02B 27/0273* (2013.01); *F02M 35/0204* (2013.01)

(58) Field of Classification Search
CPC ......... F02M 35/0209; F02M 35/02416; F02M 35/10144; F02M 35/10255; F02M 35/0204; F02B 27/02; F16K 17/02
See application file for complete search history.

(56) References Cited

U.S. PATENT DOCUMENTS

2019/0376477 A1 * 12/2019 Lee .................... B60H 3/0616

FOREIGN PATENT DOCUMENTS

| KR | 30-0532901 | * | 6/2009 |
|---|---|---|---|
| KR | 30-0532901 | | 7/2009 |
| KR | 30-0532902 | | 7/2009 |
| KR | 10-1180220 | | 9/2012 |
| KR | 10-1655645 | | 8/2016 |
| KR | 10-2018-0052966 | | 5/2018 |
| KR | 10-2019-00139494 | | 12/2019 |

* cited by examiner

*Primary Examiner* — Jacob M Amick
(74) *Attorney, Agent, or Firm* — Mintz Levin Cohn Ferris Glovsky and Popeo, P.C.; Peter F. Corless

(57) ABSTRACT

A variable intake system for a vehicle is provided and includes an air cleaner that filters air via a filter and supplies the air to an engine. A main duct is connected to the air cleaner to supply the air, and a variable valve has a housing that is coupled and mounted to a mounting aperture of a mounting part disposed on a front end of the filter of the air cleaner. An internal passage of the housing is opened by suction pressure of the engine in the mounting part to suction external air. A projection formed on the housing of the variable valve is inserted into a projection seat formed in the mounting part, so that the variable valve is secured to the mounting part.

16 Claims, 7 Drawing Sheets

VARIABLE INTAKE SYSTEM FOR VEHICLE

CROSS REFERENCE TO RELATED APPLICATION

The present application claims priority to Korean Patent Application No. 10-2020-0033670, filed Mar. 19, 2020, the entire contents of which are incorporated herein for all purposes by this reference.

BACKGROUND

Field of the Invention

The present disclosure relates to a variable intake system for a vehicle, and more particularly, to a variable intake system for a vehicle, which has a variable valve to vary the amount of intake air according to engine operating conditions.

Description of the Related Art

As is well known to those skilled in the art, an engine of a vehicle requires air to burn fuel, and is supplied with the required air from an outside of the vehicle. However, since the air present outside of the vehicle contains a substantial amount of foreign matter such as dust, it is necessary to remove the foreign matter contained in the air in an intake process. Accordingly, the air introduced into the engine of the vehicle passes through an air cleaner, thus removing the foreign matter from the air.

Conventionally, a separable-type air cleaner in which a body part and a cover part are separated from each other has been developed. A clamp fixing method of fixing the cover part to the body part using several clamps is applied to the separable-type air cleaner. Thus, when one desires to replace a filter with a new one, all the clamps are loosened, to separate the cover part from the body part, and then the filter is replaced. Subsequently, the cover part and the body part are coupled to each other again, and then fixed to each other via the clamps.

However, the separable-type air cleaner is problematic in that several clamps are exposed to the outside, thus reducing an aesthetic appearance, and space for manipulating each clamp is required, and the clamps are required to be loosened one by one to separate the cover part from the body part, and thus, it is complicated to replace the filter with a new one. Therefore, recently, a drawer-type air cleaner configured to simply open and close a door so as to replace the filter with a new one is widely used.

The drawer-type air cleaner is configured such that a rotatable-type door for opening or closing a filter receiving part is installed in the cover part. When replacing the filter with a new one, the door is rotated to open an entrance of the filter receiving part, to replace the filter in the filter receiving part with a new one.

Meanwhile, a variable intake system with a variable valve capable of adjusting the inflow amount of intake air according to engine operating conditions in a vehicle has been developed. In the conventional variable intake system, a sub-duct is additionally connected to the air cleaner to be installed therein, apart from a main duct connected to the air cleaner. The variable valve is installed in the sub-duct to be opened by the suction pressure of the engine (i.e. intake negative pressure).

In particular, the variable valve may be installed at an exit of the sub-duct disposed in the air cleaner. In the variable intake system, since the suction pressure of the engine is minimal in a low-speed (e.g., low RPM) operation of the engine, external air is introduced into the air cleaner only through the main duct while the variable valve is closed.

In contrast, since the suction pressure of the engine increases in a high-speed (high RPM) operation of the engine, an additional amount of air may be introduced through the sub-duct while the variable valve is opened. To be more specific, in the separable-type air cleaner, the sub-duct as well as the main duct is inserted from an outside of the body part to an inside thereof to be installed in the body part, and the variable valve is installed at the sub-duct.

The variable valve is a valve that opens or closes a passage of the sub-duct according to the engine operating conditions, and includes a rotatable flap that is opened or closed according to the suction pressure of the engine. In the separable-type air cleaner, the variable valve may be installed in the exit of the sub-duct disposed in an internal space of the body part. Conventionally, to install the variable valve, the variable valve is fixed to the exit of the sub-duct located in the body part via a rivet or a bolt, before assembling the cover part of the air cleaner, and then the cover part is assembled with the body part.

In the separable-type air cleaner, since the interior of the body part is opened before the cover part is assembled and a working space for installing the variable valve in the body part in an open state may be secured, it is possible to assemble the variable valve by disposing it into the body part. However, in the drawer-type air cleaner, it is impossible to apply a variable valve module which is applied to the existing separable-type air cleaner.

In other words, in the drawer-type air cleaner, the cover part is joined to be fixed to the body part in an ultrasonic vibration welding method. If the cover part is joined to the body part in the ultrasonic vibration welding method after the variable valve is fastened to the body part via the rivet or the bolt, cracks or damage may occur at a joint of the variable valve and the air cleaner during the ultrasonic vibration welding process.

Furthermore, when intake negative pressure increases in a high output engine, time of opening the variable valve may be undesirably delayed. If a restoring force (e.g., closing force) of the valve is substantial, hitting noise may be excessively generated due to surface contact between the flap and a valve housing. To reduce the hitting noise, the flap and the valve housing may be maintained separated by a stopper even when the variable valve is closed. However, in this case, engine noise may be discharged through a gap, so that the noise, vibration, harshness (NVH) performance of the vehicle may be deteriorated.

The foregoing is intended merely to aid in the understanding of the background of the present disclosure, and is not intended to mean that the present disclosure falls within the purview of the related art that is already known to those skilled in the art.

SUMMARY

The present disclosure provides a variable intake system for a vehicle, which improves a mounting structure of a variable valve to solve a problem of the related art in which cracks or damage may occur at a joint of the variable valve and an air cleaner, and which simultaneously solves both a hitting-noise problem at the variable valve and an engine-noise discharging problem. Furthermore, another objective of the present disclosure is to provide a variable intake system for a vehicle, which may be responsive to a problem in which time of opening a variable valve is delayed in a high output engine.

In order to achieve the objective of the present disclosure, the present disclosure provides a variable intake system for a vehicle that may include an air cleaner configured to filter air via a filter and supply the air to an engine; a main duct connected to the air cleaner to supply the air; and a variable valve having a housing coupled and mounted to a mounting aperture of a mounting part provided on a front end of the filter of the air cleaner, and an internal passage of the housing may be opened by suction pressure of the engine in the mounting part to suction external air. A projection formed on the housing of the variable valve may be inserted into a projection seat formed in the mounting part to secure the variable valve to the mounting part.

The mounting aperture may be formed in a circular shape in the mounting part, a plurality of projections may be formed on the housing of the variable valve, a plurality of projection seats may be formed in an inner surface of the mounting part around the mounting aperture to couple each of the projections to a corresponding projection seat, and a plurality of projection entry grooves may be formed in an edge of the mounting aperture in the mounting part so that each of the projections passes through an inside of the mounting part, and thus, in a state where each of the projections passes through a corresponding projection entry groove to enter the inside of the mounting part, the projection may be inserted into each of the projection seats by rotation of the variable valve including the housing.

The projection seat may be formed by two protruding steps that extend from the inner surface of the mounting part to be spaced apart from each other, and in the space between the two protruding steps may be a groove space into which the projection may be inserted. The two protruding steps may each have a protruding shape in which a surface thereof rises gradually towards the groove space, so that a height of the surface may be gradually increased from the inner surface of the mounting part towards the groove space. The mounting part may be a part on the front end of the filter in the air cleaner.

The air cleaner may include a body part having a predetermined internal volume; a cover part having a predetermined internal volume and coupled to an upper side of the body part; and a filter installed in a filter receiving part disposed in internal space defined by the body part and the cover part. Additionally, the mounting part may be the body part that is the part on the front end of the filter of the air cleaner. The air cleaner may be a drawer-type air cleaner and the filter may be inserted and received in the filter receiving part in a sliding manner. The mounting part may be the main duct. Alternatively, the mounting part may be a sub-duct connected to the part on the front end of the filter of the air cleaner, separately from the main duct.

The variable valve may include a housing that defines an internal passage in which air may be suctioned; a flap rotatably hinged to the housing and rotated to open or close the internal passage of the housing according to engine suction pressure in the mounting part; and a sealing member disposed on the flap to come into contact with the housing when the flap is closed. A hinge part may be formed on an upper end of the housing, a joint may be formed on the upper end of the flap to be hinged to the hinge part of the housing, and a stopper may protrude from the upper end of the flap to come into contact with the housing when the flap rotates downwards to close the internal passage of the housing, thus maintaining a gap between the housing and the flap.

The variable valve may further include magnets installed in a lower end of the flap and a lower end of the housing, and the magnet of the flap and the magnet of the housing may be installed to provide attractive force to maintain the flap closed. The sealing member may include a main wing part formed along an entire circumference of an edge thereof to protrude towards the housing, thus coming into close contact with the housing when the flap is closed; and a sub-wing part that extends from a lower end of the sealing member to form a 'V'-shaped section with a lower end of the main wing part, and coming into contact with the housing when the flap is closed, thus forming an air pocket with the main wing part and a surface of the housing.

The sealing member may include a main wing part that protrudes from an edge of the flap towards the housing to come into close contact with the housing when the flap is closed. The main wing part may be formed along the entire circumference of the edge of the sealing member, and an inner portion of the main wing part in the sealing member may be fixed to the flap. The sealing member may further include a sub-wing part that defines an air pocket of a 'V'-shaped section with the main wing part when the sealing member is in contact with the housing.

Thus, the variable intake system according to the present disclosure improves the configuration, mounting structure and position of the variable valve, thus solving the problem of the related art in which cracks or damage may occur at the joint of the variable valve. Furthermore, it may be possible to simultaneously solve the hitting-noise problem between the flap and the housing when the variable valve is closed and the engine-noise discharging problem that may occur when the flap is separated from the housing with the variable valve being closed, due to the sealing member installed on the flap. Additionally, according to the present disclosure, it may be possible to respond to the problem in which the time of opening the variable valve is delayed in the high output engine, and the opening time of the variable valve may be maintained constant by the stopper of the flap, so that the robustness and durability of the variable valve may be improved.

BRIEF DESCRIPTION OF THE DRAWINGS

The above and other objectives, features, and other advantages of the present disclosure will be more clearly understood from the following detailed description when taken in conjoint with the accompanying drawings, in which.

DETAILED DESCRIPTION

Figure 1:
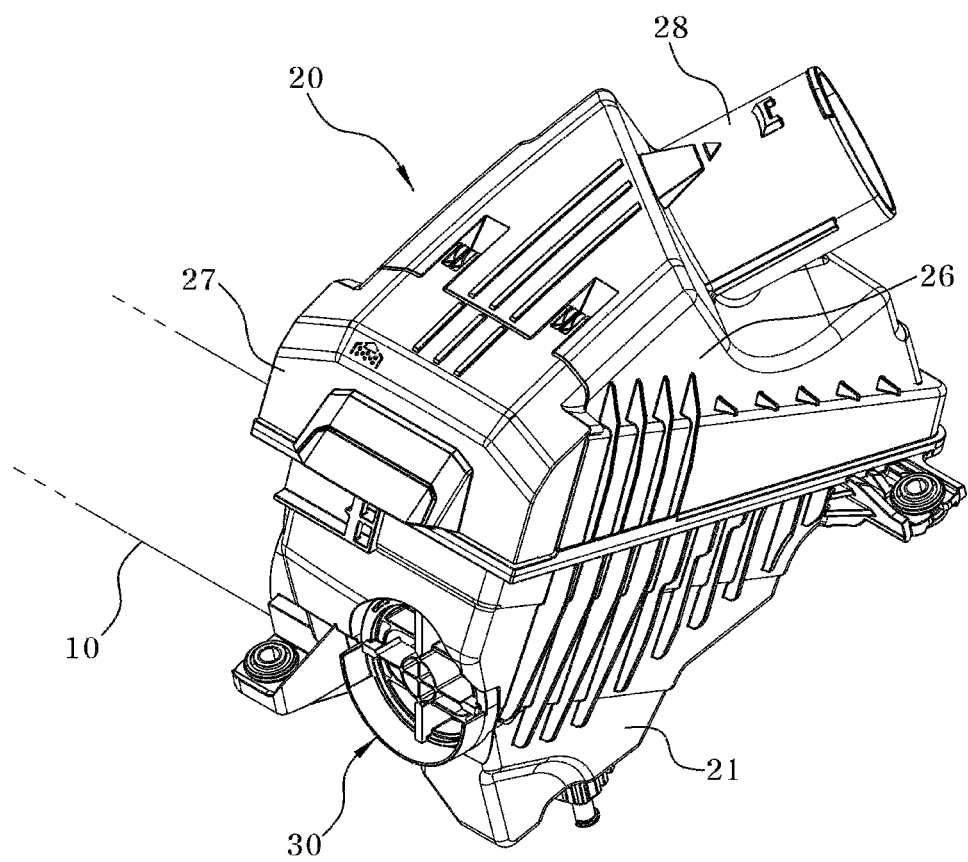
FIG. 1 is a perspective view showing a coupled state of an air cleaner and a variable valve in a variable intake system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, embodiments of the present disclosure will be described in detail with reference to the accompanying drawings so that those skilled in the art can easily embody the present disclosure. However, the present disclosure may be modified in various forms without being limited to exemplary embodiments that are set forth herein.

The present disclosure is directed to a variable intake system for a vehicle which improves the mounting structure and position of a variable valve to solve a problem of the related art in which cracks or damage may occur at a joint of the variable valve, and which simultaneously can solve a hitting-noise problem at the variable valve and an engine-noise discharging problem. The variable intake system according to the present disclosure may include an air cleaner, a main duct, and a variable valve. Among the above-mentioned components, the air cleaner may be a drawer-type air cleaner.

Furthermore, in the present disclosure, the variable valve may be installed in a given mounting part disposed on a front end of a filter of the air cleaner in the intake system. In particular, the mounting part may be the front end of the filter of the air cleaner, or a main duct that is an intake duct on the front end of the filter connected to the air cleaner, or a sub-duct connected to the front end of the filter of the air cleaner apart from the main duct. The front end of the filter of the air cleaner may be a body part of the air cleaner.

When the variable valve is installed at the main duct, the valve may be installed on a wall of the main duct. When the variable valve is installed at the sub-duct, the valve may be installed on a wall of the sub-duct outside the air cleaner. Both the main duct and the sub-duct are the intake duct on the front end of the filter connected to the air cleaner.

In an exemplary embodiment of the present disclosure, when the variable valve is installed at the body part of the air cleaner, the sub-duct may be omitted. In particular, external air around the air cleaner may be suctioned into the air cleaner through the variable valve installed at the body part without passing through a separate duct. When the suction pressure (e.g., intake negative pressure) of the engine acts on the internal space of the air cleaner, a flap of the variable valve installed at the body part may be opened while being rotated towards an inside of the air cleaner by the suction pressure of the engine.

The variable intake system may be operated as follows. When the engine is operated, external air may be introduced through the main duct into the internal space of the air cleaner by the suction pressure of the engine. Meanwhile, under engine operating conditions where the suction pressure of the engine increases, the flap may be opened, and thus, external air may be additionally suctioned through the variable valve. Accordingly, the flap of the variable valve may be opened or closed according to the engine operating conditions. For example, since the suction pressure increases in the high-speed (e.g., high RPM) operation of the engine, the flap may be rotated to be opened by the suction pressure. In contrast, since the suction pressure of the engine decreases in the low-speed (e.g., low RPM) operation of the engine, the flap is not opened and may be maintained in a closed position by the suction pressure.

Hereinafter, the configuration of the variable intake system according to an exemplary embodiment of the present disclosure will be described in more detail. FIG. 1 is a perspective view showing a coupled state of an air cleaner and a variable valve in a variable intake system according to an exemplary embodiment of the present disclosure. The illustrated air cleaner 20 may be a drawer-type air cleaner.

As illustrated in the drawing, in the variable intake system according to the exemplary embodiment, the drawer-type air cleaner 20 may include a body part 21 that is a lower part having a predetermined internal volume, and a cover part 26 that is an upper part (relative to the body part) having a predetermined internal volume. Additionally, a filter (not shown) may be installed in a filter receiving part (not shown) disposed in an internal space of the air cleaner 20. The filter receiving part may be disposed between the body part 21 and the cover part 26. Particularly, even in the internal space of the air cleaner 20, the filter receiving part may be disposed on a boundary between the internal space of the body part 21 and the internal space of the cover part 26. The filter receiving part may be configured to receive the filter on a side of the cover part 26 at the boundary, namely, inside a joint of the cover part 26 and the body part 21.

If the filter is inserted into the filter receiving part, the filter is transversely disposed along the boundary between both the internal spaces of the body part 21 and the cover part 26. Particularly, an entrance (not shown) of the filter receiving part may be formed in the cover part 26. A rotary door 27 may be installed on the cover part 26 to open or close the entrance of the filter receiving part. When the door 27 rotates upwards at the cover part 26, the entrance of the filter receiving part is opened, and thus, the filter may slide and be inserted into the filter receiving part through the open entrance.

When the filter is inserted into the air cleaner 20 as described above, the lower internal space of the air cleaner 20, namely, the internal space of the body part 21 under the filter when seen in the drawings becomes a primary side (dirty side) space of the air cleaner through which external air before being filtered may be introduced and then pass through. The main duct 10 may be connected to a side of the body part 21 and thus, the external air may be suctioned. Since the external air introduced into the internal space of the body part 21 passes upwards through the filter in the air cleaner 20, the upper internal space of the air cleaner 20, namely, the internal space of the cover part 26 above the filter when seen in the drawings becomes a secondary side (clean side) space of the air cleaner 20 through which air filtered by the filter passes.

An outlet 28 may be formed on a side of the cover part 26 to discharge the air that is filtered by passing through the filter. A duct (not shown) may be connected to the outlet 28 to supply the filtered air into the engine. Consequently, when the suction pressure (e.g., intake negative pressure) of the engine acts on the internal space (e.g., the secondary side space of the air cleaner) of the cover part 26 through the outlet 28 of the air cleaner 20 and the duct connected thereto, external air may be suctioned through the main duct 10 and then may be introduced into the internal space (e.g., the primary side space of the air cleaner) of the body part 21. Subsequently, the introduced air passes upwards through the filter and then flows to the internal space of the cover part 26. Thereafter, the air filtered by the filter may be suctioned from the internal space of the cover part 26 through the outlet 28 and the duct towards the engine.

Meanwhile, a separate inlet (reference numeral '22' in FIG. 4) may be formed in the air cleaner 20, and the variable valve 30 may be installed in the inlet 22. The inlet 22 is a mounting aperture in the air cleaner 20 in which the variable valve 30 may be fixedly mounted. When the flap 39 is rotated by the suction pressure of the engine in the state where the variable valve 30 is installed in the inlet 22, the variable valve 30 may be opened and the external air around the air cleaner 20 may be suctioned through the variable valve 30 to the internal space (e.g., primary side space) of the air cleaner 20.

Referring to FIG. 1, the variable valve 30 may be installed in the body part 21 of the air cleaner 20. As illustrated in the drawing, the variable valve 30 may be installed in the body part 21 of the air cleaner 20. However, as described above, the variable valve 30 may be installed in the main duct 10 connected to the air cleaner 20, or the variable valve 30 may be installed in the sub-duct that is separately connected to the air cleaner 20.

Accordingly, the variable valve 30 may be installed at positions other than the air cleaner 20 as long as the positions are on the primary side (dirty side) of the front end of the filter through which air flows before being filtered in the variable intake system. The variable valve 30 may be installed at the body part 21 of the air cleaner 20 as well as the main duct 10 or the sub-duct disposed on the primary side (dirty side) of the front end of the filter.

Figure 2:
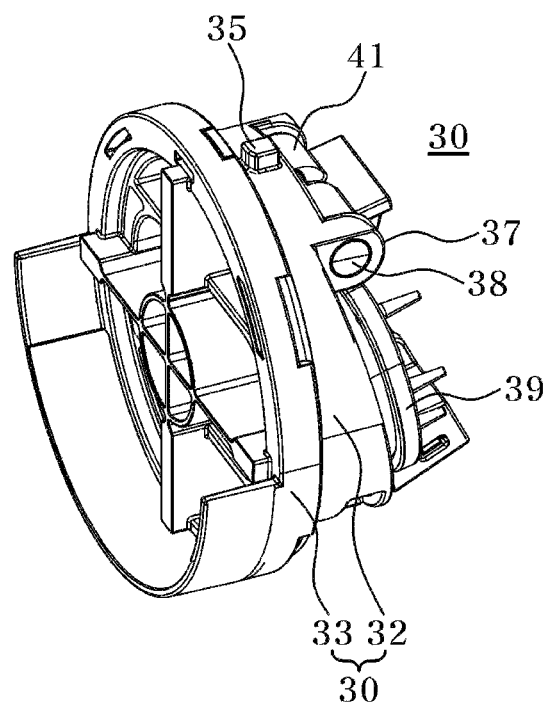
FIG. 2 is a perspective view showing the variable valve in the variable intake system according to the exemplary embodiment of the present disclosure.
Figure 3:
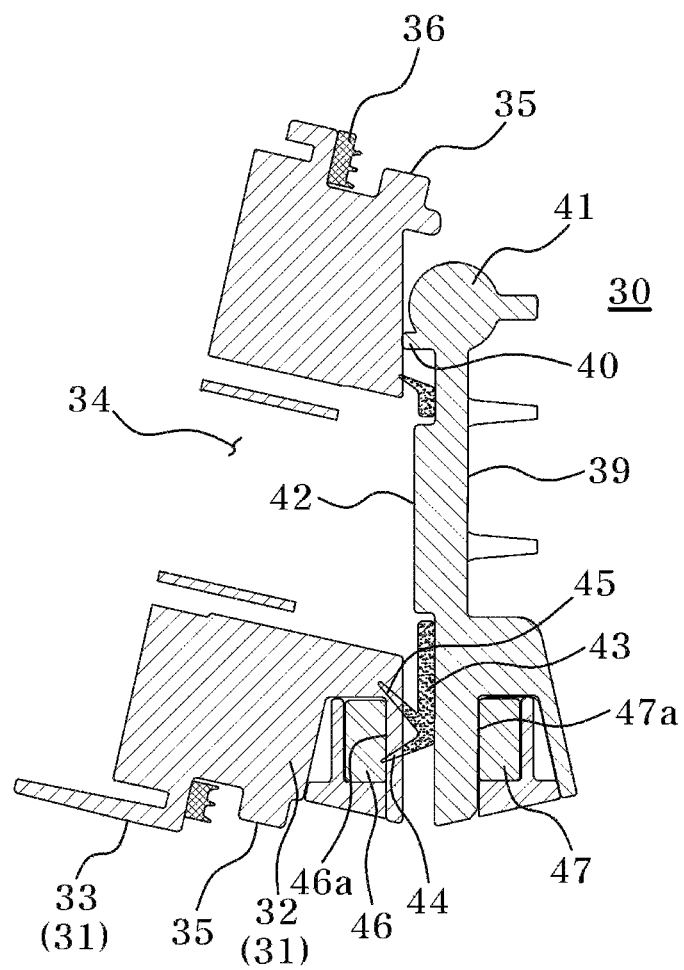
FIG. 3 is a sectional view of the variable valve in the variable intake system according to the exemplary embodiment of the present disclosure.
Figure 4:
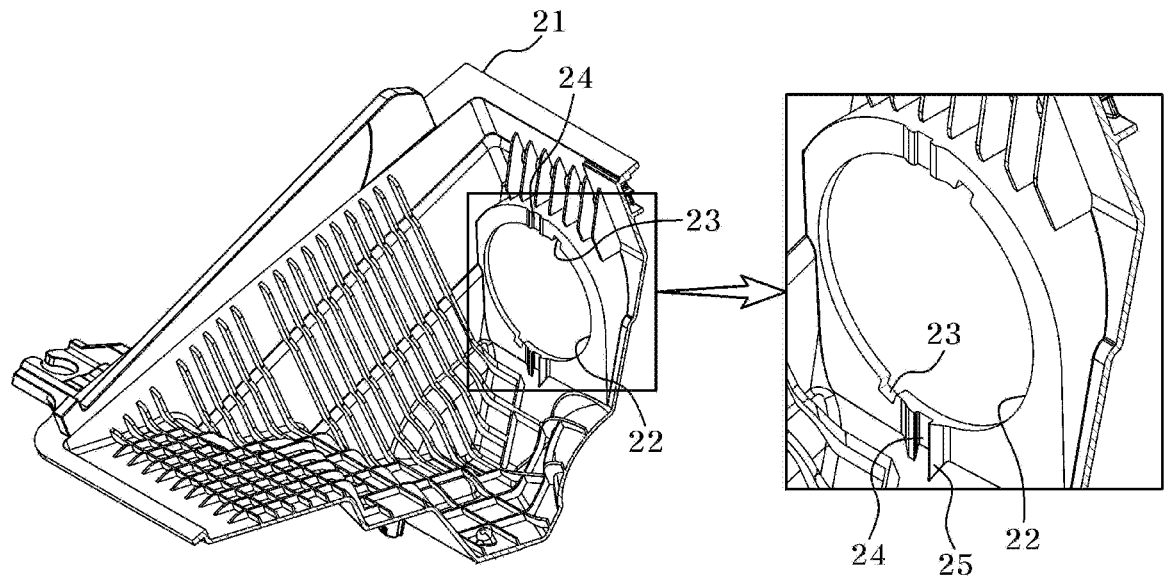
FIG. 4 is a cutaway perspective view illustrating an inner surface of a body part of an air cleaner and a mounting aperture in which the variable valve is installed, in the variable intake system according to the exemplary embodiment of the present disclosure.
Figure 5:
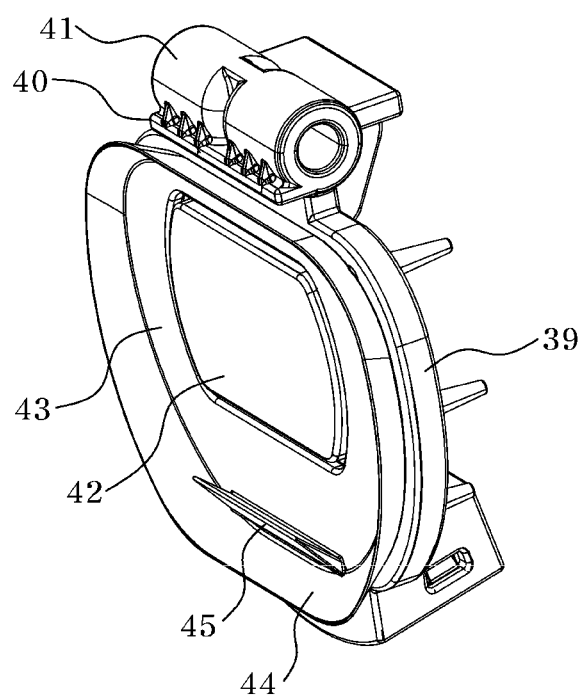
FIG. 5 is a perspective view showing a flap of the variable valve in the variable intake system according to the exemplary embodiment of the present disclosure.

FIG. 2 is a perspective view showing the variable valve in the variable intake system according to the exemplary embodiment of the present disclosure, and FIG. 3 is a sectional view of the variable valve in the variable intake system according to the exemplary embodiment of the present disclosure. Furthermore, FIG. 4 is a cutaway perspective view illustrating the inner surface of the body part of the air cleaner and the mounting aperture in which the variable valve is installed, in the variable intake system according to the exemplary embodiment of the present disclosure, and FIG. 5 is a perspective view showing the flap of the variable valve in the variable intake system according to the exemplary embodiment of the present disclosure.

The variable intake system according to the exemplary embodiment of the present disclosure may include a noise reduction variable valve 30 that may be installed in the drawer-type air cleaner 20. The variable valve 30 may be installed in the mounting aperture 22 that is formed separately in the body part 21 of the air cleaner 20. Referring to FIG. 4, the circular mounting aperture 22 may be formed in the body part 21 of the air cleaner 20, and the variable valve 30 may be fixedly inserted into the mounting aperture 22. The mounting aperture 22 is an aperture in which the variable valve 30 may be mounted, but may be an inlet through which the external air is introduced into the air cleaner 20 when the flap 39 of the variable valve is opened. The mounting aperture 22 may be an aperture that is used as the inlet of the variable valve in the air cleaner.

In the exemplary embodiment of the present disclosure, the variable valve 30 may include a housing 31 that is fixed to the mounting aperture 22 of the body part 21, a flap 39 that is rotatably coupled to the housing to open or close an internal passage 34 of the housing 31, and a sealing member 43 disposed on the flap to come into contact with the housing 31 when the flap 39 is closed. Accordingly, the variable valve 30 may include the flap 39 that opens or closes the internal passage 34 of the housing 31. In particular, the internal passage 34 of the housing 31 is a passage through which the air may be introduced into the internal space of the air cleaner 20.

In the variable intake system according to the present disclosure, the variable valve is the noise reduction variable valve that may simultaneously solve a hitting-noise problem caused by surface contact between the flap and the housing in a closing operation where the flap closes the internal passage of the housing and an engine-noise discharging problem that may occur when the flap is separated from the housing with the flap closing the internal passage of the housing. Furthermore, in the variable intake system according to the present disclosure, the variable valve may solve a problem in which cracks or damage may occur at a joint of the variable valve and the air cleaner during assembly, and may be improved in mounting structure and position to improve assemblability and mountability in the air cleaner.

First, a projection entry groove 23 may be formed in the mounting aperture 22 in the body part 21 of the air cleaner 20 in which the variable valve 30 is mounted, and thus, a projection 35 of the variable valve may be inserted into the projection entry groove 23 to enter the inside of the body part 21. In the exemplary embodiment of the present disclosure, a plurality of projections 35 may be formed on the housing 31 of the variable valve 30. A plurality of projection entry grooves 23 may be formed on an edge of the mounting aperture 22 of the body part 21 at position corresponding to the respective projections.

Referring to FIG. 4, two projection entry grooves 23 may be formed, respectively, at upper and lower positions along the edge of the mounting aperture 22 of the body part 21 to be spaced apart from each other at an angular interval of about 180°. In particular, as shown in FIG. 3, two projections 35 may be formed, respectively, at upper and lower positions of the housing 31 of the variable valve 30 to be spaced apart from each other at an angular interval of about 180° and correspond to the projection entry grooves.

Furthermore, projection seats 24 may be formed at predetermined distances from respective projection entry grooves 23. A corresponding number of projection seats 24 as the projection entry grooves 23 and the projections 35 may be formed. Each projection seat 24 may be configured such that two protruding steps 25 spaced apart from each other protrude from the inner surface of the body part 21 around the mounting aperture 22. The space between the two protruding steps 25 is a groove space in which the projection 35 of the housing 31 may be inserted and then seated.

In this regard, each protruding step 25 forms an inclined surface increasing gradually towards the groove space that is a central space. Thereby, the protruding step may be shaped such that the height of its surface is gradually increased from the inner surface of the body part 21 around the mounting aperture 22. Thus, when the housing 31 is rotated after the housing 31 is inserted into the mounting aperture 22 and the projection 35 passes through the projection entry groove 23, the projection 35 may be inserted and seated into the groove between the protruding steps 25, namely, the space in the projection seat 24 while moving along the surface of the protruding step 25.

FIG. 4 is a perspective view showing the inner surface of the body part 21 of the air cleaner 20. The housing 31 of the variable valve 30 may be coupled to the mounting aperture 22 of the body part 21 by inserting the housing from an outside of the body part 21 to an inside thereof. After a part of the housing 31 is inserted into the mounting aperture 22 so that the projection 35 passes through the projection entry groove 23, the housing 31 may be rotated so that the projection 35 is inserted and seated in the projection seat 24, thus allowing the entire variable valve 30 including the housing 31 to be fixed to the body part 21 of the air cleaner 20.

Although two projections 35, two projection entry grooves 23, and two projection seats 24 have been described, this is merely illustrative. The present disclosure is not limited thereto, and the number of each component may be variously changed. Likewise, since the interval and position of the projections 35 shown in the drawings, the interval and position of the projection entry grooves 23, and the interval and position of the projection seats 24 are merely illustrative, these intervals and positions may be variously changed.

Furthermore, when the variable valve 30 is installed at the main duct 10 or the sub-duct, a flat part may be formed on the wall of the main duct 10 or the sub-duct at which the variable valve is to be installed. As in the body part 21 of the air cleaner 20, the mounting aperture 22, the projection entry groove 23, and the projection seat 24 may be formed on the flat part. The variable valve 30 may be installed in the mounting aperture 22, and may be installed such that the flap 39 is rotated towards the inside of the duct.

Meanwhile, the housing 31 may be a fixed part of the variable valve 30 that is mounted on the body part 21 of the air cleaner 20. As described above, the projections 35 for fixing the variable valve 30 to the body part 21 of the air cleaner 20 may be formed at the upper and lower positions of the housing 31 (see FIG. 3). In an exemplary embodiment of the present disclosure, a part of a front side (reference numeral '32' of FIG. 2) of the housing 31 may have a size and a shape sufficient to pass through the mounting aperture 22 of the body part 21. In the following description, the part 32 of the front side of the housing 31 inserted into and coupled to the mounting aperture 22 may be referred to as an 'insert part'.

In an exemplary embodiment of the present disclosure, the insert part 32 of the housing 31 may be formed in approximately the same shape as the mounting aperture 22 to minimize a gap between the insert part 32 and the mounting aperture 22. For instance, when the mounting aperture 22 is a circular aperture as illustrated in FIG. 4, the entire shape of the insert part 32 may be provided in a circular shape. Particularly, a remaining part (reference numeral '33' of FIG. 2) of the housing 31 may be formed to have a diameter greater than that of the insert part 32. In the assembled state of the variable valve 30, the larger-diameter part 33 may be disposed outside the body part 21 of the air cleaner 20. In the following description, the larger-diameter part 33 of the housing 31 may be referred to as a 'housing body'.

In an exemplary embodiment of the present disclosure, the housing body 33 having a relatively greater diameter and the insert part 32 having a relatively smaller diameter may be integrated with each other to form the housing 31. The housing 31 may include the internal passage 34 to pass through the housing body 33 and the insert part 32. In addition, a seal ring 36 may be mounted on a surface of the housing body 33 along a part that is in close contact with an outer surface of the body part 21 of the air cleaner 20.

The seal ring 36 may provide a sealing function to prevent a gap from being formed between the housing 31 and the body part 21 of the air cleaner 20, thus securing air-tightness and preventing a seam from occurring. The seal ring 36 may be made of a material such as rubber, and may be attached to a surface of the housing body 33 that is in contact with the outer surface of the body part 21. The flap 39 may be disposed in front of the insert part 32 of the housing 31, may be rotatably installed to open or close the internal passage 34 of the housing, and may be installed to be rotatable from the housing 31 towards the inside of the body part 21.

In an exemplary embodiment of the present disclosure, an upper end of the flap 39 may be a hinge point with the housing 31. When the flap 39 rotates upwards about the hinge point towards the inside of the body part 21, the flap may open the internal passage 34 of the housing 31. In addition, as illustrated in FIG. 2, a joint 41 may be disposed on the upper end of the flap 39, a hinge part 37 to which the joint 41 of the flap 39 is hingedly coupled may be disposed on the upper end of the insert part 32 of the housing 31, and the joint 41 of the flap 39 may be coupled to the hinge part 37 of the housing 31 by a hinge shaft 38.

The flap 39 is a movable part repeatedly opened or closed based on whether the intake negative pressure is generated on an engine side in the housing 31. Particularly, the flap may be rotated towards the inside of the body part 21 by the suction pressure of the engine acting on the internal space of the body part 21 of the air cleaner 20, thus opening the internal passage 34 of the housing 31. Furthermore, in an exemplary embodiment of the present disclosure, a stopper 40 may be disposed around the joint 41 on the rear surface of the upper end of the flap 39, in other words, on the lower end of the joint 41 as illustrated in FIGS. 4 and 5 to protrude rearwards in a predetermined height.

The stopper 40 may maintain the gap between the housing 31 and the flap 39 when the flap 39 is closed, thus maintaining a distance between a magnet 46 of the housing 31 and the magnet 47 of the flap 39 that will be described below. Consequently, the stopper 40 may maintain the opening time of the variable valve 30 constant regardless of a change in characteristics of the sealing member 43, thus improving the robustness and the durability of the valve.

Furthermore, since the stopper 40 maintaining the gap with the housing 31 may be formed on the flap 39 at a position proximate to the rotating central axis, hitting noise generated by the stopper, namely, hitting noise generated due to the contact of the stopper and the housing may be minimized. In an exemplary embodiment of the present disclosure, the sealing member 43 may be disposed on the rear surface of the flap 39 that is in close contact (e.g., abutting contact) with the surface of the insert part 32 of the housing 31 to maintain close contact with the housing.

In an exemplary embodiment of the present disclosure, a flat protrusion 42 may be formed on a wide area on the rear surface of the flap 39 that is in contact with the internal passage of the housing 31, and the sealing member 43 may be installed to be disposed around the protrusion 42. The protrusion 42 of the flap 39 may be formed to have an area that is less than a sectional area of the internal passage 34 of the housing 31. When the valve is closed, the protrusion 42 of the flap 39 and the sealing member 43 installed around the protrusion may close the internal passage 34 of the housing 31.

In particular, the sealing member 43 is in close contact with the front surface of the insert part 32 of the housing 31 around the internal passage 34 of the housing on the rear surface of the flap 39 to close the internal passage 34 of the housing. The sealing member 43 may be attached to the rear surface of the flap 39, and may include a main wing part 44 that protrudes rearwards from an edge of the flap 39 towards the insert part 32 of the housing 31 and comes into close contact with the front surface of the insert part 32 of the housing 31 when the flap is closed.

The main wing part 44 may be formed along an entire circumference of an edge of the sealing member 43. An inside portion of the main wing part 44 on the sealing member 43 is in contact with the rear surface of the flap 39 to be fixed thereto. Furthermore, a sub-wing part 45 may be formed on the lower end of the sealing member 43 and protrudes rearwards to be located above the magnet 47 installed in the flap 39. In particular, the sub-wing part 45 of the sealing member 43 may be formed lengthwise in a lateral direction. Simultaneously, as illustrated in FIG. 3, the sub-wing part may be formed to have a 'V'-shaped section with the lower end of the main wing part 44 of the sealing member 43.

As illustrated in FIGS. 3 and 5, the sub-wing part 45 on the lower end of the sealing member 43 may protrude to be inclined upwards, and the main wing part 44 may protrude to be inclined downwards. Thus, as shown in FIGS. 3 and 5, the sub-wing part 45 of the sealing member 43 may form an air pocket with the main wing part 44 and a surface of the housing 31.

As shown in FIG. 3, the sealing member 43 installed on the flap 39 may maintain air-tightness between the flap 39 and the housing 31 when the sealing member is compressed against the housing 31 when the flap is closed (i.e., when the valve is closed), and may thus reduce hitting noise generated while the flap is being closed and discharge noise generated in a state where the flap is closed. Particularly, when the flap 39 is closed, the sub-wing part 45 and the main wing part 44 of the sealing member 43 and the surface of the housing 31 form the air pocket that temporarily confines air. While the air contained in the air pocket is discharged through open space on both ends of the sub-wing part 45, both the wing parts 44 and 45 and the air pocket may operate as an air damper, thus reducing the hitting noise.

Furthermore, in an exemplary embodiment of the present disclosure, the variable valve 30 may further include magnets 46 and 47 that are installed, respectively, in the lower end of the insert part 32 of the housing 31 and the lower end of the flap 39. The magnets 46 and 47 may be installed in magnet receiving parts 46*a* and 47*a* that are formed in the lower end of the insert part 32 and the lower end of the flap 39. Two magnets 46 and 47 may be installed at positions where magnetic force may act therebetween. The two magnets 46 and 47 may be installed so that attractive force acts therebetween to maintain the flap closed.

Figure 6:
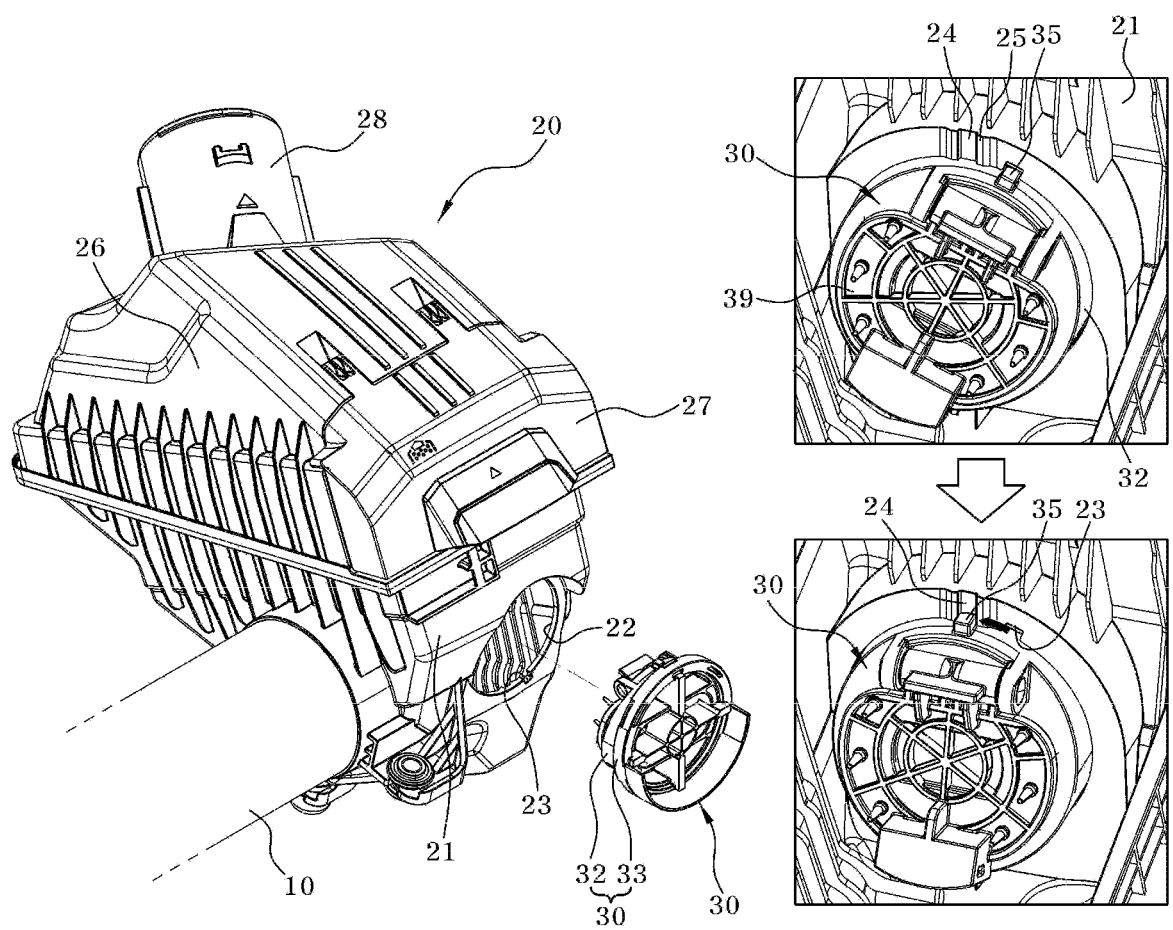
FIG. 6 is a diagram showing a state in which the variable valve is assembled with the body part of the air cleaner, in the variable intake system according to the exemplary embodiment of the present disclosure.

FIG. 6 is a diagram showing a state in which the variable valve is assembled with the body part of the air cleaner, in the variable intake system according to the exemplary embodiment of the present disclosure. As shown in the drawing, when the body part 21 and the cover part 26 of the air cleaner 20 are coupled with each other by the ultrasonic vibration welding method, the variable valve 30 may be fixedly inserted into the mounting aperture 22 formed in the body part 21. The insert part 32 in the housing 31 of the variable valve 30 may be inserted to pass through the mounting aperture 22 of the body part 21.

In particular, the projection 35 of the housing 31 may pass through the projection entry groove 23 formed in the edge of the mounting aperture 22, and thus, the projection 35 may be inserted into the body part 21 together with the insert part 32 of the housing 31. Subsequently, when the entire variable valve 30 is rotated counterclockwise when seen in the drawing in the state where the insert part 32 of the housing 31 is inserted into the mounting aperture 22 of the body part 21, the projection 35 of the housing 31 may be inserted into the projection seat 24 formed on the inner surface of the body part 21 around the mounting aperture 22, and thus, the housing 31 of the variable valve 30 may be fixed to the body part 21 of the air cleaner 20.

In the variable intake system according to the present disclosure, the variable valve may be fastened to the air cleaner without using an additional tool or without separate work such as bolting or riveting, and may be easier to assemble and disassemble the variable valve, thus making it possible to reduce production and maintenance time.

Figure 7:
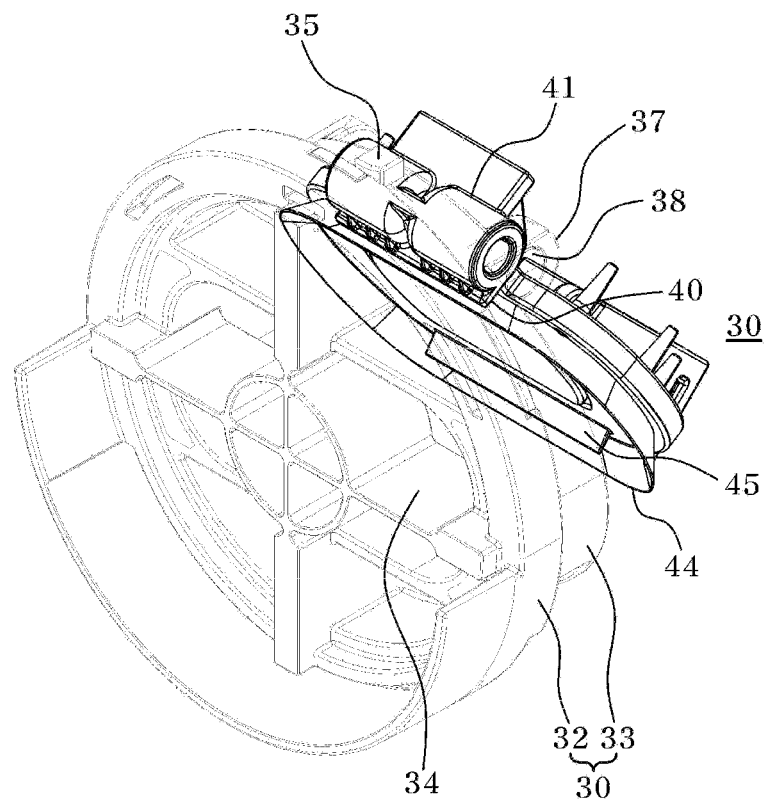
FIG. 7 is a perspective view showing an open state of the variable valve, in the variable intake system according to the exemplary embodiment of the present disclosure.
Figure 8:
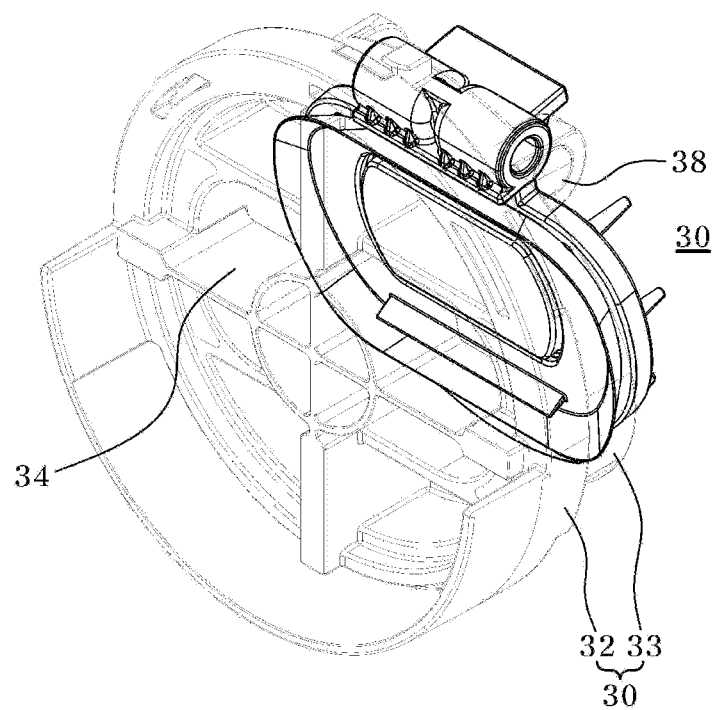
FIG. 8 is a perspective view showing a closed state of the variable valve, in the variable intake system according to the exemplary embodiment of the present disclosure.
Figure 9:
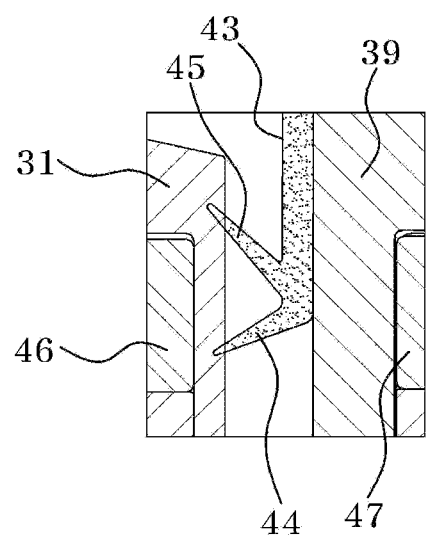
FIG. 9 is an enlarged sectional view showing a state in which a main wing part and a sub-wing part of a sealing member come into close contact with a housing, in the variable intake system according to the exemplary embodiment of the present disclosure.

FIG. 7 is a perspective view showing the open state of the variable valve, in the variable intake system according to the exemplary embodiment of the present disclosure, and FIG. 8 is a perspective view showing the closed state of the variable valve, in the variable intake system according to the exemplary embodiment of the present disclosure. Furthermore, FIG. 9 is an enlarged sectional view showing a state in which the main wing part and the sub-wing part of the sealing member come into close contact with the housing, in the variable intake system according to the exemplary embodiment of the present disclosure.

As shown in FIG. 7, if a substantial amount engine suction pressure (e.g., intake negative pressure) exceeding a predetermined level acts on the primary side space of the front end of the filter, for instance, the internal space of the body part 21 of the air cleaner 20, the flap 39 may be rotated about the hinge shaft 38 on the upper end thereof towards the inside of the body part 21 to open the internal passage 34 of the housing 31. Thus, external air present around the air cleaner 20 may be introduced through the internal passage 34 of the housing 31 into the internal space of the body part 21 of the air cleaner 20.

Thereafter, if the engine suction pressure is decreased, the flap 39 may be rotated in a direction closing the internal passage 34 of the housing 31, and the stopper 40 formed on the upper end of the flap 39 comes into contact with a surface of the upper end of the housing 31. Furthermore, when the flap 39 is closed, the main wing part 44 and the sub-wing part 45 of the sealing member 43 installed on the flap 39 are in close contact with the surface of the lower end of the housing 31, and the air may be temporarily filled in the air pocket defined by the main wing part 44, the sub-wing part 45, and the surface of the housing 31. Thereafter, while the air being discharged through the open space on both ends of the sub-wing part 45, both the wing parts 44 and 45 and the air pocket operate as a damper between the flap 39 and the housing 31, thus reducing the hitting noise.

Thereby, the variable intake system according to the present disclosure improves the mounting structure and the position of the variable valve, thus solving the problem of the related art in which cracks or damage may occur at the joint of the variable valve in the assembly process. Furthermore, by improving the shape and structure of the sealing member installed on the flap of the variable valve, it may be possible to suppress hitting noise generated when the flap comes into contact with the housing, and to improve the performance of blocking noise discharged from the engine. As a result, improvement on the NVH performance of the vehicle may be expected.

Although the present disclosure was described with reference to specific exemplary embodiments shown in the drawings, it is apparent to those skilled in the art that the present disclosure may be changed and modified in various ways without departing from the scope of the present disclosure, which is described in the following claims.

What is claimed is:

1. A variable intake system for a vehicle, comprising:
an air cleaner configured to filter air via a filter and supply the air to an engine;
a main duct connected to the air cleaner to supply the air; and
a variable valve having a housing coupled and mounted to a mounting aperture of a mounting part disposed on a front end of the filter of the air cleaner, wherein an internal passage of the housing is opened by suction pressure of the engine in the mounting part to suction external air,
wherein a projection formed on the housing of the variable valve is inserted into a projection seat formed in the mounting part to secure the variable valve to the mounting part.

2. The variable intake system of claim 1, wherein:
the mounting aperture is formed in a circular shape in the mounting part,
a plurality of projections is formed on the housing of the variable valve,
a plurality of projection seats is formed in an inner surface of the mounting part around the mounting aperture to couple each of the projections to a corresponding projection seat,
a plurality of projection entry grooves is formed in an edge of the mounting aperture in the mounting part and each of the projections passes through an inside of the mounting part, and
wherein, in a state where each of the projections passes through a corresponding projection entry groove to enter the inside of the mounting part, the projection is inserted into each of the projection seats by rotation of the variable valve including the housing.

3. The variable intake system of claim 1, wherein the projection seat is formed by two protruding steps that protrude from the inner surface of the mounting part to be spaced apart from each other, and space between the two protruding steps is groove space into which the projection is inserted.

4. The variable intake system of claim 3, wherein the two protruding steps each have a protruding shape and a surface of each protruding step rises gradually towards the groove space, and a height of the surface is gradually increased from the inner surface of the mounting part towards the groove space.

5. The variable intake system of claim 1, wherein the mounting part is a part on the front end of the filter in the air cleaner.

6. The variable intake system of claim 1, wherein the air cleaner includes:
a body part having a predetermined internal volume;
a cover part having a predetermined internal volume and coupled to an upper side of the body part; and
a filter installed in a filter receiving part disposed in internal space defined by the body part and the cover part,
wherein the mounting part is the body part on the front end of the filter of the air cleaner.

7. The variable intake system of claim 6, wherein the air cleaner is a drawer-type air cleaner configured and the filter is inserted and received in the filter receiving part in a sliding manner.

8. The variable intake system of claim 1, wherein the mounting part is the main duct.

9. The variable intake system of claim 1, wherein the mounting part is a sub-duct connected to the part on the front end of the filter of the air cleaner, separately from the main duct.

10. The variable intake system of claim 1, wherein the variable valve includes:
a housing defining an internal passage into which air is suctioned;
a flap rotatably hinged to the housing and rotated to open or close the internal passage of the housing according to engine suction pressure in the mounting part; and
a sealing member disposed on the flap to come into contact with the housing in a state where the flap is closed.

11. The variable intake system of claim 10, wherein:
a hinge part is formed on an upper end of the housing,
a joint is formed on the upper end of the flap to be hinged to the hinge part of the housing, and
a stopper protrudes from the upper end of the flap to come into contact with the housing when the flap rotates downwards to close the internal passage of the housing, maintaining a gap between the housing and the flap.

12. The variable intake system of claim 11, wherein the variable valve further includes a magnet installed in a lower end of the flap and a magnet installed a lower end of the housing, and the magnet of the flap and the magnet of the housing are installed to act attractive force to maintain the flap closed.

13. The variable intake system of claim 11, wherein the sealing member includes:
   a main wing part formed along an entire circumference of an edge thereof to protrude towards the housing, coming into close contact with the housing when the flap is closed; and
   a sub-wing part that protrudes from a lower end of the sealing member to form a V-shaped section with a lower end of the main wing part, and coming into contact with the housing when the flap is closed, forming an air pocket with the main wing part and a surface of the housing.

14. The variable intake system of claim 10, wherein the sealing member includes a main wing part that protrudes from an edge of the flap towards the housing to come into close contact with the housing when the flap is closed.

15. The variable intake system of claim 14, wherein the main wing part is formed along the entire circumference of the edge of the sealing member, and an inner portion of the main wing part in the sealing member is fixed to the flap.

16. The variable intake system of claim 14, wherein the sealing member further includes a sub-wing part that defines an air pocket of a V-shaped section with the main wing part in a state where the sealing member is in contact with the housing.

* * * * *